United States Patent

Peters et al.

(10) Patent No.: US 8,914,221 B2
(45) Date of Patent: Dec. 16, 2014

(54) METHODS AND SYSTEMS FOR EXHAUST GAS RECIRCULATION

(75) Inventors: Eric David Peters, Lawrence Park, PA (US); Shashi Kiran, Lawrence Park, PA (US); Nicholas Hansen, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 13/357,870

(22) Filed: Jan. 25, 2012

(65) Prior Publication Data

US 2013/0186376 A1   Jul. 25, 2013

(51) Int. Cl.
F02D 45/00 (2006.01)
F02D 41/00 (2006.01)

(52) U.S. Cl.
CPC ........ *F02D 41/0065* (2013.01); *F02D 41/0077* (2013.01)
USPC ..................................... 701/108; 123/568.21

(58) Field of Classification Search
CPC ............ F02M 25/0772; F02D 41/0065; F02D 41/0077; F02D 45/00
USPC ........................... 123/568.2, 568.21; 701/108
See application file for complete search history.

(56) References Cited

U.S. PATENT DOCUMENTS

| | | | |
|---|---|---|---|
| 6,098,602 A | 8/2000 | Martin et al. | |
| 7,680,585 B2 | 3/2010 | Itoga et al. | |
| 7,693,645 B2 | 4/2010 | Nam | |
| 8,091,535 B2 | 1/2012 | Nitzke et al. | |
| 8,230,843 B2 * | 7/2012 | Kurtz | 123/568.12 |
| 8,388,712 B2 * | 3/2013 | Zhang et al. | 55/302 |
| 8,726,658 B2 * | 5/2014 | Styles et al. | 60/605.2 |
| 2009/0199825 A1 | 8/2009 | Piper et al. | |
| 2011/0000187 A1 | 1/2011 | Elsaesser et al. | |
| 2014/0214302 A1 * | 7/2014 | Parikh et al. | 701/101 |

FOREIGN PATENT DOCUMENTS

| | | |
|---|---|---|
| DE | 102006054043 A1 | 5/2008 |
| DE | 102007062097 A1 | 6/2009 |
| EP | 1892400 A2 | 2/2008 |

OTHER PUBLICATIONS

Search Report and Written Opinion from corresponding PCT Application No. PCT/US2012/070217 dated Mar. 26, 2013.

\* cited by examiner

*Primary Examiner* — Hai Huynh

(74) *Attorney, Agent, or Firm* — GE Global Patent Operation; John A. Kramer

(57) ABSTRACT

Various methods and systems are provided for diagnosing an engine component condition in an exhaust gas recirculation system. In one example, a method includes selectively routing exhaust from a subset of engine cylinders to an exhaust passage via a first valve and to an intake passage via a second valve, and obtaining one or more of a pressure or temperature from the subset of engine cylinders. The method further includes indicating an engine component condition based on the one or more of the pressure or temperature.

24 Claims, 4 Drawing Sheets

METHODS AND SYSTEMS FOR EXHAUST GAS RECIRCULATION

FIELD

Embodiments of the subject matter disclosed herein relate to engines. Other embodiments relate to engine diagnostics.

BACKGROUND

Engines may utilize recirculation of exhaust gas from an engine exhaust system to an engine intake system, a process referred to as exhaust gas recirculation (EGR), to reduce regulated emissions. In some examples, a group of one or more cylinders may have an exhaust manifold that is exclusively (and/or selectively) coupled to an intake passage of the engine such that the group of cylinders is dedicated, at least under some conditions, to generating exhaust for EGR. Such cylinders may be referred to as "donor cylinders." Further, some EGR systems may include multiple valves to direct exhaust to an intake passage and/or an exhaust passage based on a desired amount of EGR.

BRIEF DESCRIPTION

Under some conditions, the multiple valves may become stuck in undesired positions, or may be inadvertently mis-positioned.

Thus, in one embodiment, an example method includes selectively routing exhaust from a subset of engine cylinders to an exhaust passage via a first valve and to an intake passage via a second valve, and obtaining one or more of a pressure or a temperature of the exhaust from the subset of engine cylinders. The method further includes indicating an engine component condition, such as degradation in one or more of the valves, based on the one or more of the pressure or temperature. For example, if the valves are mis-positioned such that exhaust gas from the subset of cylinder is overly restricted, increased temperature and pressure are generated in the exhaust manifold, which may lead to degradation of the system and/or engine.

Thus, by monitoring the temperature and/or pressure in the exhaust manifold of the subset of cylinders (e.g., donor cylinders), the engine component condition may be determined. For example, if at least one of the temperature and/or pressure increases at a rate greater than a threshold rate, the engine component condition may be indicated. The engine component condition may be degradation of one or both of the first and second valves, for example. As another example, the engine component condition may be an erroneous signal from a control system. In this manner, degradation may be identified and one or more operating parameters may be adjusted responsive to the indication such that temperature and pressure in the exhaust manifold of the subset of cylinders may be reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for diagnosing an engine component condition in an exhaust gas recirculation (EGR) system. In one example, a method comprises selectively routing exhaust from a subset of engine cylinders to an exhaust passage via a first valve and to an intake passage via a second valve. The method further comprises obtaining one or more of an exhaust pressure or temperature in an exhaust manifold coupled to the subset, and indicates an engine component condition based on the one or more of exhaust pressure or temperature. In such an example, the engine component condition may be degradation of the first and/or second valve (e.g., one or both of the valves are stuck closed) or an erroneous signal from the control system. In response to the indication of the engine component condition, a control signal may be generated to control one or more operating parameters to be adjusted, such as fueling of the subset of engine cylinders and/or engine power. For example, fueling to the subset of engine cylinders may be cut-off such that temperature and pressure in the exhaust manifold of the subset of cylinders are reduced, thereby decreasing engine degradation and/or degradation of the system.

In one embodiment, the first and second valves may be part of an EGR system coupled to an engine in a vehicle. In some embodiments, a locomotive system may be used to exemplify one of the types of vehicles having engines to which the EGR system may be attached. Other types of vehicles may include on-highway vehicles and off-highway vehicles other than locomotives or other rail vehicles, such as mining equipment and marine vessels. Other embodiments of the invention may be used for EGR systems that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

Figure 1:
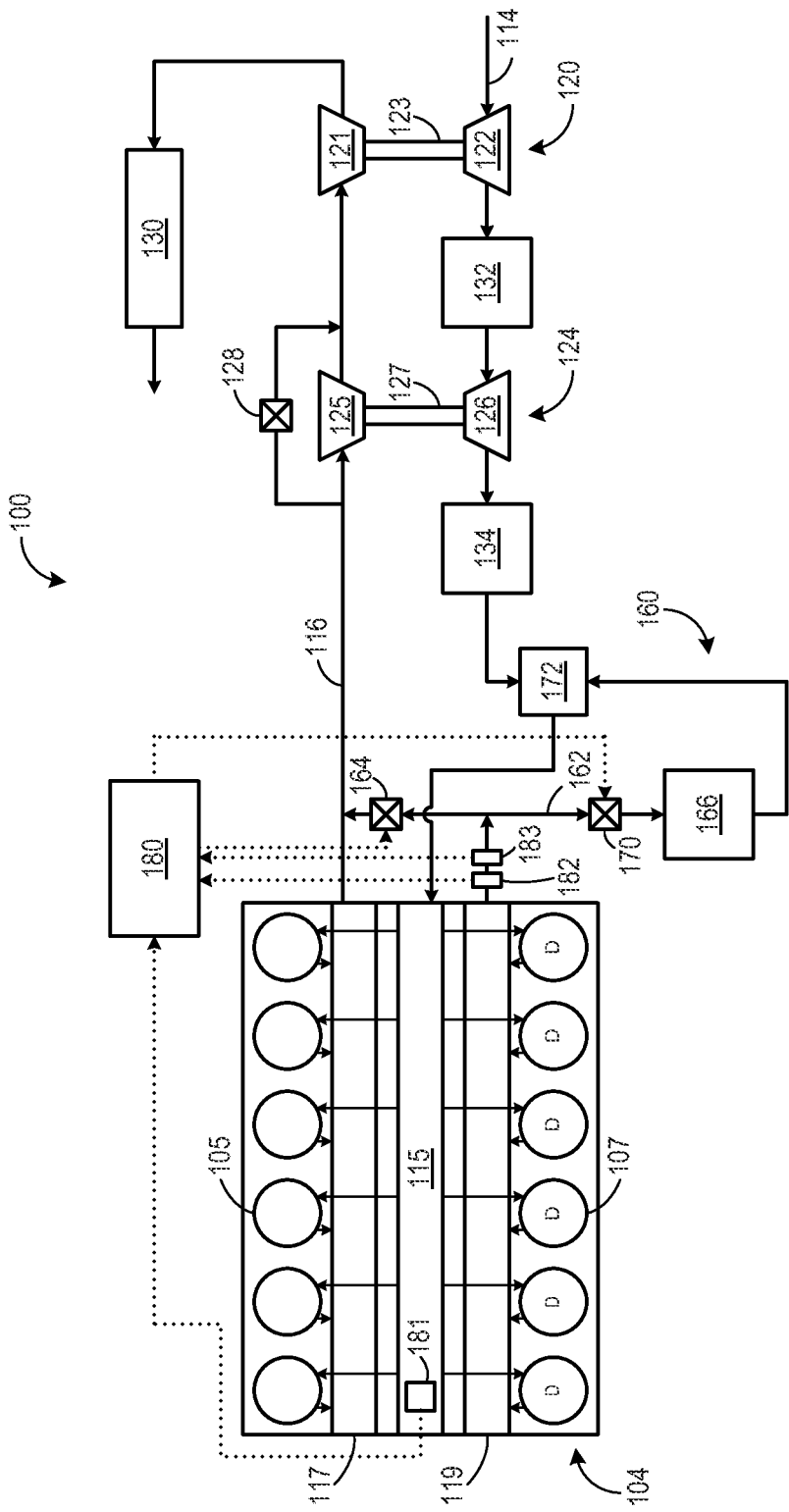
FIG. 1 shows a schematic diagram of an engine with an exhaust gas recirculation system.

FIG. 1 shows a block diagram of an exemplary embodiment of an engine system 100 with an engine 104, such as an internal combustion engine.

The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116.

In the example embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

In the example embodiment shown in FIG. 1, when a second valve 170 is open, exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Further, the EGR system 160 includes a first valve 164 disposed between the exhaust passage 116 and the EGR passage 162. The second valve 170 may be an on/off valve controlled by the control unit 180 (for turning the flow of EGR on or off), or it may control a variable amount of EGR, for example. In some examples, the first valve 164 may be actuated such that an EGR amount is reduced (exhaust gas flows from the EGR passage 162 to the exhaust passage 116). In other examples, the first valve 164 may be actuated such that the EGR amount is increased (e.g., exhaust gas flows from the exhaust passage 116 to the EGR passage 162). In some embodiments, the EGR system 160 may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. In the example embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

The engine system 100 further includes a temperature sensor 182 and a pressure sensor 183 disposed in the exhaust gas recirculation system 160 upstream of the first valve 164 and the second valve 170. As described below with reference to FIGS. 2 and 3, the first and second valves 164 and 170 may be adjusted based on temperature measured by the temperature sensor 182 and/or pressure measured by the pressure sensor 183. In some embodiments, each of the engine cylinders may include a separate temperature sensor and/or pressure sensor such that there are a plurality of temperature sensors and/or pressure sensors. In other examples, the engine system may include a plurality of temperatures sensors disposed downstream of the exhaust valve of each of the engine cylinders and only one pressure sensor, or vice versa.

As shown in FIG. 1, the engine system 100 further includes an EGR mixer 172 which mixes the recirculated exhaust gas with charge air such that the exhaust gas may be evenly distributed within the charge air and exhaust gas mixture. In the example embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the engine system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the engine system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The second turbocharger 124 operates at a relatively higher pressure, and includes a second turbine 125 which drives a second compressor 126. The second turbine and the second compressor are mechanically coupled via a second shaft 127. In the example embodiment shown in FIG. 1, the second turbocharger 124 is provided with a wastegate 128 which allows exhaust gas to bypass the second turbocharger 124. The wastegate 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. In other embodiments, each of the turbochargers 120 and 124 may be provided with a wastegate, or only the second turbocharger 124 may be provided with a wastegate.

The engine system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The engine system 100 further includes the control unit 180, which is provided and configured to control various components related to the engine system 100. In one example, the control unit 180 includes a computer control system. The control unit 180 further includes non-transitory, computer readable storage media (not shown) including code for enabling on-board monitoring and control of engine operation. The control unit 180, while overseeing control and management of the engine system 100, may be configured to receive signals from a variety of engine sensors, as further elaborated herein, in order to determine operating parameters and operating conditions, and correspondingly adjust various engine actuators to control operation of the engine system 100. For example, the control unit 180 may receive signals from various engine sensors including, but not limited to, engine speed, engine load, boost pressure, ambient pressure, exhaust temperature, exhaust pressure, etc. Correspondingly, the control unit 180 may control the engine system 100 by sending commands to various components such as traction motors, alternator, cylinder valves, throttle, heat exchangers, wastegates or other valves or flow control elements, etc.

As another example, the control unit may receive signals from various temperature sensors and pressure sensors disposed in various locations throughout the engine system. For example, the control unit may receive signals from a temperature sensor 182 positioned upstream of the EGR cooler 166, a pressure sensor 183 positioned upstream of the EGR cooler in the EGR system 160, and a manifold air temperature (MAT) sensor 181 positioned in the intake manifold 115. Based on the signals received indicating the EGR temperatures and pressures and the manifold air temperature, for example, one or both of the charge air coolers 132 and 134 may be adjusted such that a desired manifold air temperature is achieved. In other examples, the first valve 164 and the second valve 170 may be adjusted to adjust an amount of exhaust gas flowing through the EGR cooler to control the manifold air temperature or to route a desired amount of exhaust to the intake manifold for EGR.

In some embodiments, an upgrade kit that may be installed in an engine system includes a non-transient computer readable medium including instructions for diagnosing an engine component condition, such as degradation of the first and/or second valve, based on the temperature and pressure sensors disposed in the EGR system. The upgrade kit may further include one or more sensors or other mechanical elements, such as temperature sensors, pressure sensors, valves, and the like. Further, the upgrade kit may further include media with human-readable instructions for installing the additional sensors, mechanical elements, and/or software upgrade.

Figure 2:
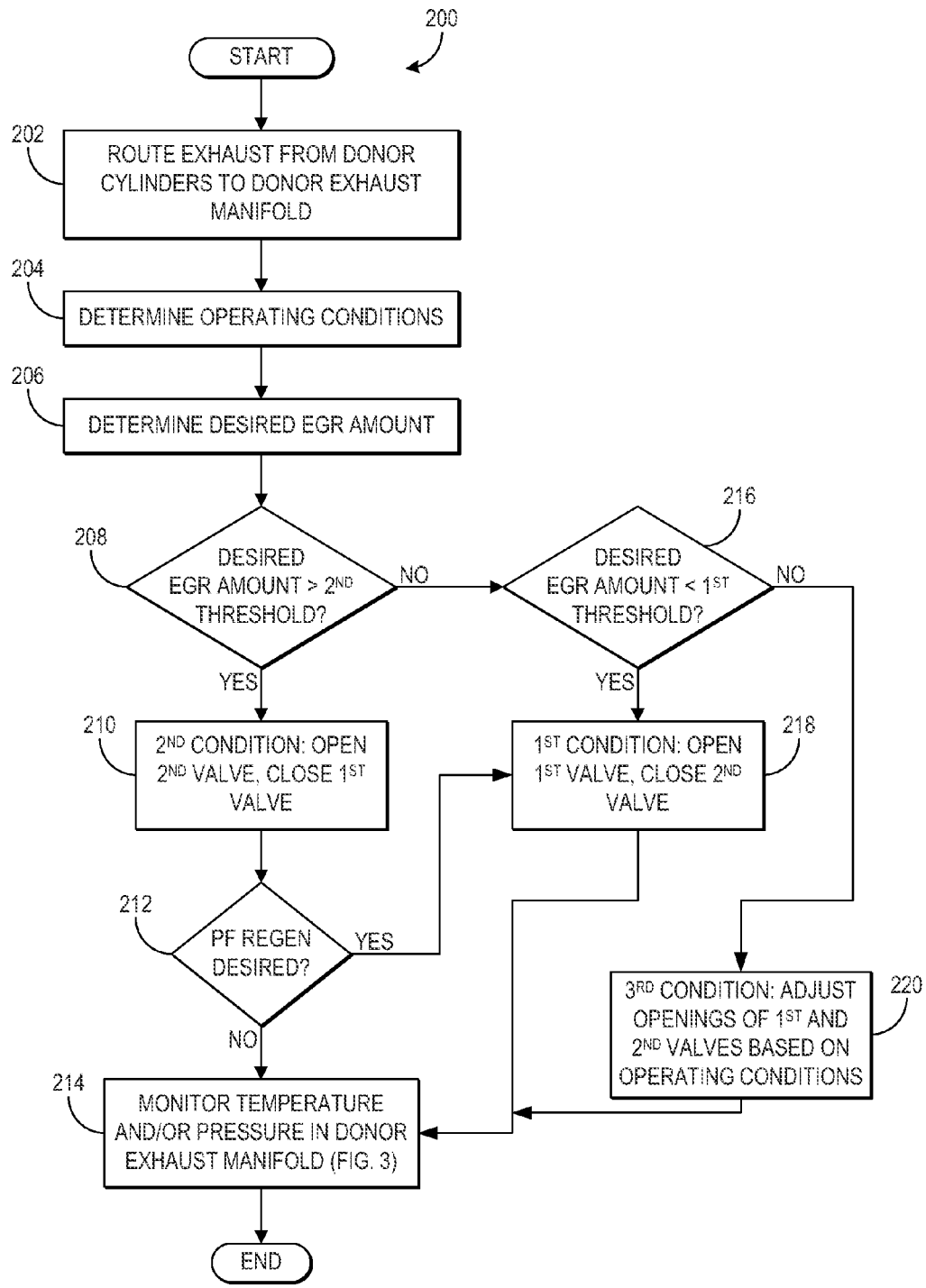
FIG. 2 shows a flow chart illustrating a method for adjusting first and second valves in an exhaust gas recirculation system.
Figure 3:
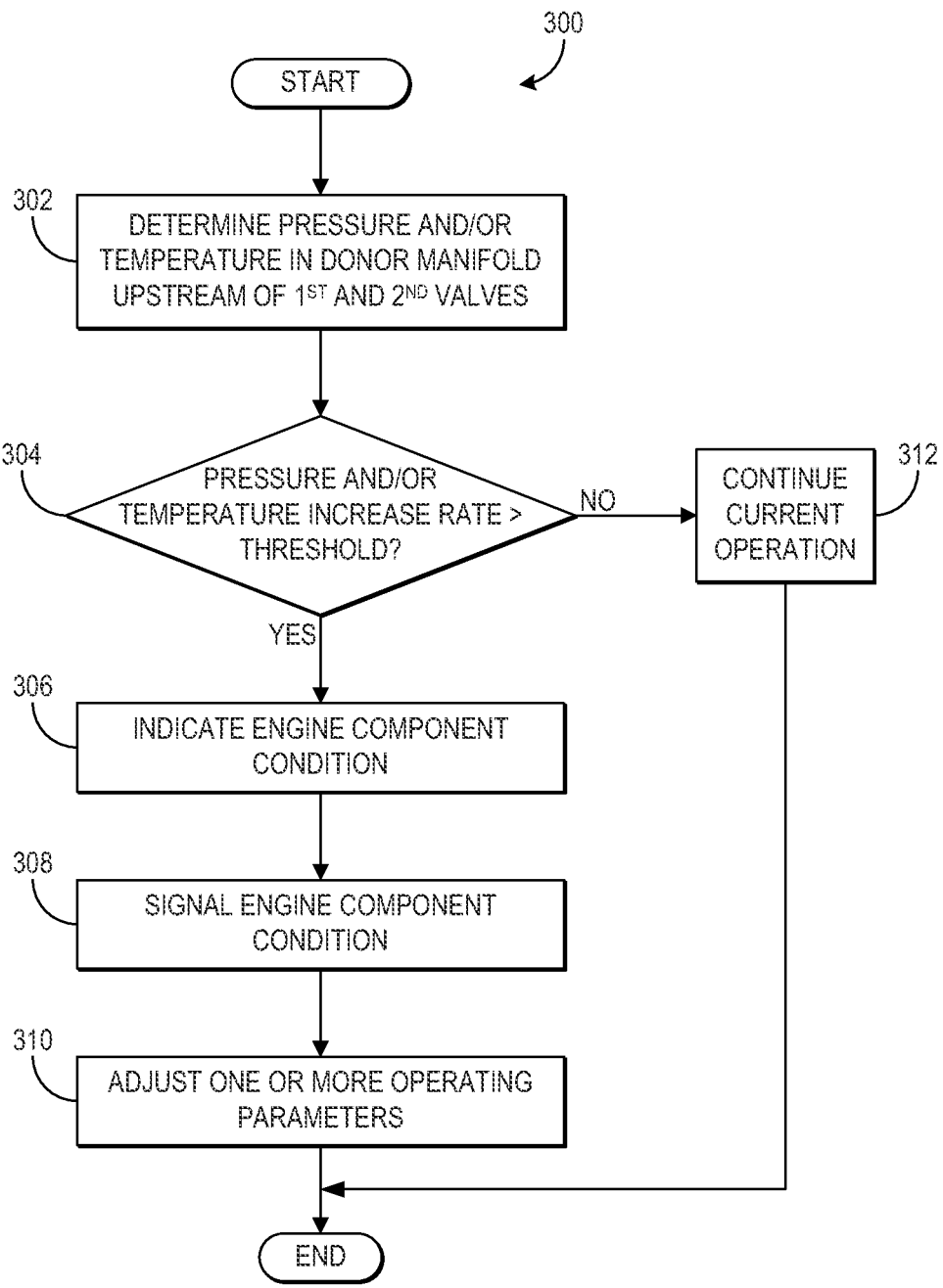
FIG. 3 shows a flow chart illustrating a method for diagnosing an engine component condition.

FIGS. 2 and 3 show flow charts illustrating methods for an exhaust gas recirculation system with first and second valves, such as the exhaust gas recirculation system 160 described above with reference to FIG. 1. In particular, FIG. 2 shows a method for controlling the first and second valves in the EGR system based on operating conditions. For example, when more EGR is desired, the second valve may be adjusted to be more open and the first valve may be adjusted to be more closed. Likewise, when less EGR is desired, the first valve may be adjusted to be more open and the second valve may be adjusted to be more closed. As will be described below, the system may operate under three conditions based on the positions of the first and second valve. Further, during each of the three conditions, temperature and/or pressure may be monitored in the donor cylinder exhaust manifold such that an engine component condition, such as degradation of the valves, may be determined, as described with reference to FIG. 3.

Continuing to FIG. 2, a flow chart illustrating a method 200 for controlling first and second valves in an exhaust gas recirculation system, such as the first and second valve described above with reference to FIG. 1, is shown. Specifically, the method determines current operating conditions and adjusts the valves based on the operating conditions. For example, the valves may be adjusted based on a desired amount of EGR or to facilitate particulate filter regeneration.

At step 202 of the method, exhaust from the donor cylinders is routed to the donor cylinder exhaust manifold. For example, after combustion occurs in each of the donor cylinders, an exhaust valve of each of each of the cylinders opens such that exhaust may be released from the cylinders into the donor cylinder exhaust manifold.

At step 204, operating conditions are determined. As non-limiting examples, the operating conditions may include engine load, engine speed, exhaust temperature, amount of $NO_x$ generation, and the like. Once the operating conditions are determined, a desired amount of EGR is determined at step 206. The desired amount of EGR may be based on conditions such as the amount of $NO_x$ generation. For example, as the amount of $NO_x$ generated during combustion increases or as a target air fuel ratio increases, a greater amount of EGR may be desired, and vice versa.

Once the desired amount of EGR is determined, the method proceeds to step 208 where it is determined if the desired amount of EGR is greater than a second threshold. As an example, the second threshold may be close to or approximately a maximum amount of EGR based on the operating conditions. For example, the second threshold may be an amount of EGR that is achievable under the current operating conditions when the first valve is fully closed and the second valve is fully open.

If it is determined that the desired amount of EGR is greater than the second threshold amount, control signals may be generate to adjust the first and second valves such that a second condition is carried out. During the second condition, the second valve is opened substantially more than the first valve, and the first valve is closed more than a threshold amount. In one example, the second valve is opened and the first valve is closed such that substantially all the exhaust from the donor cylinders flows to the intake manifold for exhaust gas recirculation. In this manner, the amount of EGR may be increased to the desired amount.

At step 212 of the method, it is determined if particulate filter regeneration is desired. Particulate filter regeneration may be desired when a soot level of the particulate filter exceeds a threshold level, for example. As examples, it may be determined that the soot level is greater than the threshold level based on a pressure drop across the particulate filter or a soot sensor disposed in the particulate filter.

If it is determined that particulate filter regeneration is not desired, the method continues to step 214 and temperature and/or pressure in the donor cylinder exhaust manifold are monitored, as will be described in greater detail with reference to FIG. 3. For example, one or both of the temperature and pressure are estimated at one or more locations in the donor cylinder exhaust manifold such that an engine component condition such as degradation may be determined.

Returning to step 208, if it is determined that the desired amount of EGR is less than the second threshold, the method moves to step 216 and it is determined if the desired amount of EGR is less than a first threshold. The first threshold may be a minimum amount of EGR, for example, or substantially no EGR. The desired amount of EGR may be less than the first threshold amount during conditions such as low engine load and/or when $NO_x$ generation is less than a threshold level, for example.

If it is determined that the desired amount of EGR is less than the threshold amount at step 216 or if it is determined that particulate filter regeneration is desired at step 212, the method moves to step 218, and control signals are generated to adjust the first and second valves such that a first condition is carried out. During the first condition, the first valve may be opened substantially more than the second valve, and the second valve is closed more than a threshold amount. In one example, the first valve may be fully opened and the second valve may be fully closed such that substantially all the exhaust flows from the donor cylinders to the exhaust manifold. In this manner, the amount of EGR may be substantially reduced, for example. Further, particulate filter regeneration may be carried out under high load conditions, and a temperature of the exhaust may be further increased to facilitate particulate filter regeneration by closing the second valve and opening the first valve such that substantially all the exhaust is routed to the exhaust passage.

In some examples, particulate filter regeneration may be carried out by closing the first and second valves and cutting-off fuel injection to the donor cylinders. In such a configuration, the donor cylinders may work against the valves as only a compressor, thereby increasing the load to the non-donors cylinders. The increased load on the non-donor cylinders allows for higher exhaust gas temperatures in the aftertreatment system, for example, allowing for regeneration of the particulate filter or temperatures that are conducive for active regeneration.

Continuing with FIG. 2, once the first valve is opened and the second valve is closed, the method continues to step 214 where temperature and/or pressure in the donor cylinder exhaust manifold are monitored, as will be described below with reference to FIG. 3. For example, one or both of the temperature and pressure are estimated at one or more locations in the donor cylinder exhaust manifold such that an engine component condition such as degradation may be determined.

Returning to step 216, if it is determined that the EGR amount is greater than the first threshold amount (but less than the second threshold amount), the method moves to step 220, and control signals are generated to adjust the first and second valves based on operating conditions such that a third condition is carried out. During the third condition, the first valve and the second valve may be concurrently at least partially opened or opened greater than a threshold amount. In one example, the first valve and the second valve may be opened the same amount. In another example, the first valve may be opened more than the second valve. As yet another example, the second valve may be opened more than the first valve. By concurrently opening the first and second valves at least partially, the amount of EGR may be reduced from the maximum amount of EGR (e.g., when the first valve is fully closed and the second valve is fully open), and relatively different amounts of exhaust may be routed to the intake passage and the exhaust passage.

Once each of the first and second valves is opened greater than a threshold amount, the method continues to step 214 where temperature and/or pressure in the donor cylinder exhaust manifold are monitored, as will be described below with reference to FIG. 3. For example, one or both of the temperature and pressure are estimated at one or more locations in the donor cylinder exhaust manifold such that an engine component condition such as degradation may be determined.

Thus, the exhaust gas recirculation system may be operated under several conditions. Under the first condition, the second valve is closed more than a threshold amount and substantially all of the exhaust from the donor cylinders is routed to the exhaust passage. Under the second conditions, the first valve is closed more than a threshold amount and substantially all of the exhaust from the donor cylinder is routed to the intake passage. Under the third condition, the first valve and the second valve are each open more than a threshold amount and different portions of exhaust may be routed from the donor cylinders to the intake passage and the exhaust passage. Under each of the conditions, temperature and/or pressure in the donor cylinder exhaust manifold may be monitored such that an engine component condition may be identified, as described below.

Continuing to FIG. 3, a flow chart illustrating a method for monitoring temperature and/or pressure in a donor cylinder exhaust manifold upstream of first and second valves of an exhaust gas recirculation system, such as the first and second valves described above with reference to FIG. 1, is shown. Specifically, the temperature and/or pressure at a location upstream of the first and second valves is determined and an engine component condition is diagnosed based the temperature and/or pressure. For example, the engine component condition may be a position of the valves, as will be described below.

At step 302 of the method, pressure and/or temperature are measured at one or more locations in the donor cylinder exhaust manifold upstream of the first and second valves. In some examples, a single temperature sensor and/or a single pressure sensor may be positioned upstream of the first and second valves. In other examples, a temperature sensor and/or a pressure sensor may be positioned at each of the engine cylinders. In still other examples, a single pressure sensor may be disposed in the donor cylinder exhaust manifold while a plurality of temperature sensors are positioned at each of the engine cylinders, or vice versa. In some examples, the temperature and pressure sensors may provide a continuous indication of temperature and pressure. In other examples, the temperature and pressure sensor may provide temperature and pressure measurements at predetermined intervals (e.g., 2 seconds, 5 seconds, 30 seconds, or the like).

Once the pressure and/or temperature are determined, the method continues to step 304 and it is determined if an increase rate of the pressure and/or an increase rate of the temperature are greater than respective threshold increase rates, or change rates. For example, the threshold increase rate of the temperature may be an increase in temperature to a threshold temperature over a duration less than a threshold duration, and the threshold increase rate of the pressure may be an increase in pressure to a threshold pressure over a duration less than a threshold duration.

Figure 4:
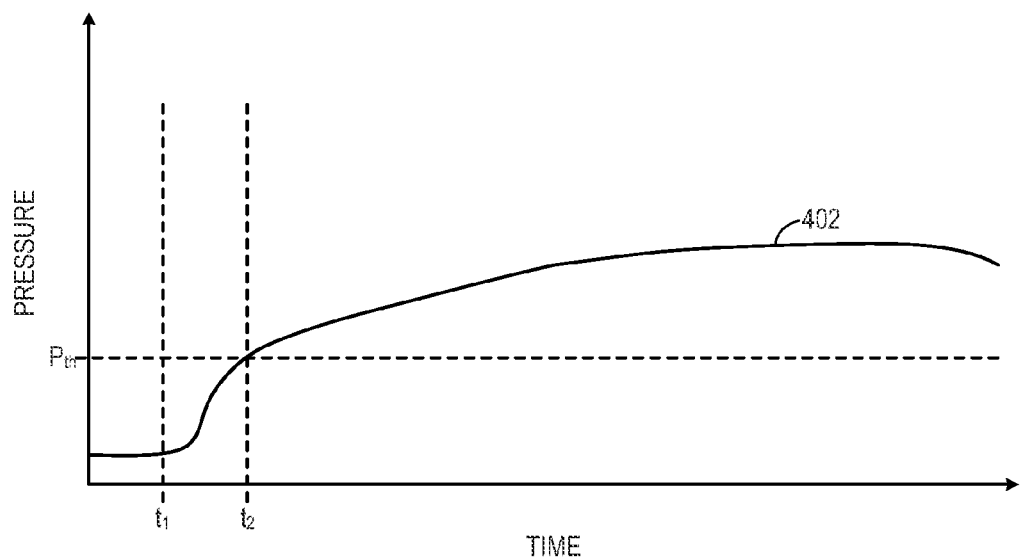
FIG. 4 shows a graph illustrating pressure over time in a donor cylinder exhaust manifold.
Figure 5:
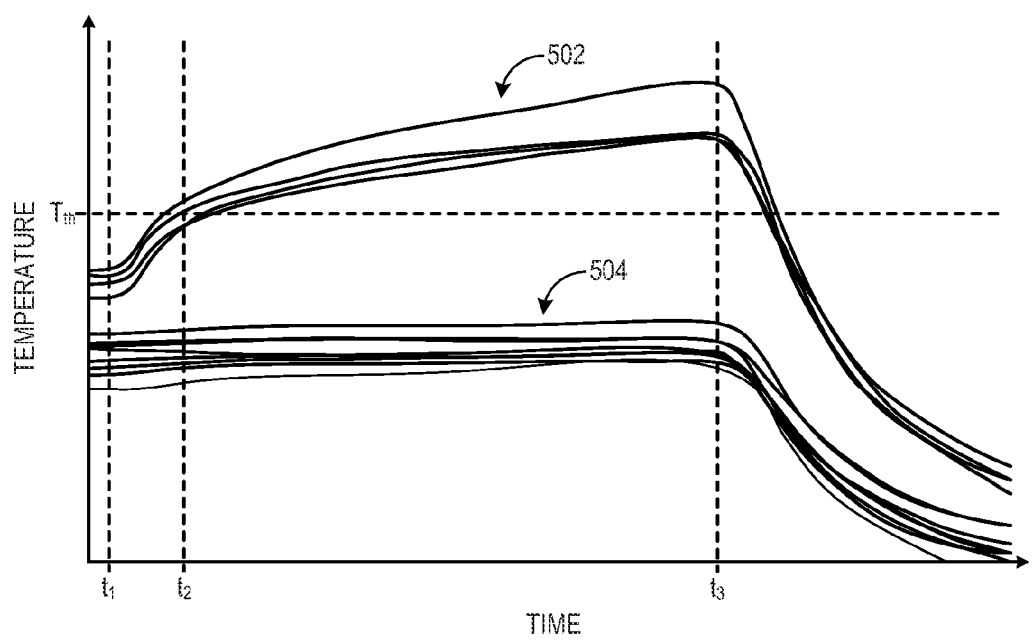
FIG. 5 shows a graph illustrating temperature over time in a donor cylinder exhaust manifold.

The graphs in FIGS. 4 and 5 show examples of pressure and temperature measurements, respectively, over time. The curve 402 in FIG. 4 shows a pressure measurement in the donor cylinder exhaust manifold over time. As depicted, the pressure increases relatively rapidly to a threshold pressure ($P_{th}$) between times $t_1$ and $t_2$. The duration between times $t_1$ and $t_2$ may be less than the threshold duration, for example. As such, degradation, which will be described in greater detail with reference to FIG. 3 below, may be indicated based on the increase in pressure shown in FIG. 4.

FIG. 5 shows a plurality of curves showing temperature over time. In the example of FIG. 5, temperature measurements downstream of exhaust valves of each of twelve engine cylinders are shown. The curves shown at 502 correspond to donor cylinders, for example, while the curves shown at 504 correspond to non-donor cylinders. As depicted, the exhaust temperatures corresponding to the donor cylinders increase relatively rapidly to a threshold temperature ($T_{th}$) between times $t_1$ and $t_2$, while the temperatures corresponding to the non-donor cylinders remain relatively steady. In such an example, degradation, which will be described in greater detail below with reference to FIG. 3, may be indicated based on the temperature increase rate of the donor cylinders. Further, in the example of FIG. 5, exhaust temperature measured at each of the cylinders begins decreasing rapidly at time $t_3$. As an example, the rapid decline in pressure may be a result of the engine exhaust reaching a predetermined temperature or pressure and shutting down.

Continuing with FIG. 3, if it is determined that an increase rate of the temperature and/or pressure is not greater than the threshold rate, the method moves to step 312 and current operation is continued. On the other hand, if the increase rate of one or both of the temperature and pressure is greater then the respective increase, rate, the method proceeds to step 306 and an engine component condition is indicated. The engine component condition may be degradation of the first and/or second valves, for example. As an example, the control system may generate a control signal to control the first valve to close and the second valve to open. Due to degradation of the second valve, the second valve may not open, thereby resulting in an increase in temperature and/or pressure in the donor cylinder exhaust manifold due to the first valve and the second valve being concurrently closed greater than a threshold amount. As another example, both the first and second valves may be commanded to close due to an erroneous signal from the control system. Thus, another control signal may be generated and the engine component condition is signaled to the control system at step 308.

Once the engine component condition is signaled, the method continues to step 310 and one or more operating parameters are adjusted responsive to the engine component condition or indication of degradation. In one example, responding to the engine component condition includes changing delivered engine power. For example, the engine power may be reduced in order to reduce temperature and pressure in the donor cylinder exhaust manifold. In another example, a fuel supply rate to the donor cylinders may be adjusted. For example, the fuel supply or fuel injection to the donor cylinders may be substantially reduced or cut-off such that combustion in the donor cylinders is suspended. In this manner, the temperature and pressure in the donor cylinder exhaust manifold may be prevented from increasing further. Further, valve timing may be adjusted such that valve overlap occurs and high temperature and pressure exhaust in the donor cylinder manifold may flow to the intake manifold such that temperature and/or pressure in the donor cylinder exhaust manifold are reduced.

In some examples, the control system may try to open one or more of the first and/or second valves in response to receiving the signal indicating the engine component condition. If the temperature and/or pressure remains above a threshold temperature or threshold pressure, respectively, after a threshold duration the control system may be configured to cut fueling to the donor cylinders. In other examples, an amount or level of degradation may be determined such that the one or more operating parameters may be adjusted accordingly. For example, it may be determined if one or both of the valves is partially open.

In some embodiments, the method may further include sampling engine component conditions over time and trending the information to calculate an end of useful life time of the valves. In such an embodiment, shopping for replacement engine components may be scheduled, for example. In other embodiments, the method may further include calculating a loss of performance in terms of emissions, dollars, fuel, power, and the like. In some examples, such an embodiment may further include comparing the loss of performance against a cost to fix or replace the degraded component.

Thus, pressure and/or temperature in the donor cylinder exhaust manifold may be monitored. When the rate of increase of at least one of the temperature and pressure is greater than the threshold rate of increase, an engine component condition such as degradation of one or both of the first and second valves in the exhaust gas recirculation system may be identified. Responsive to receiving a signal indicating the engine component condition, the control system may adjust one or more operating parameters such as engine power or fueling to the donor cylinders such that pressure in the donor cylinder exhaust manifold may be relieved and temperature may be reduced.

Another embodiment relates to a method, e.g., a method for controlling an engine. The method comprises generating first control signals for selectively routing exhaust from a subset of cylinders of an engine to an exhaust passage of the engine and to an intake passage of the engine. For example, the first control signals may be for controlling a first valve (disposed in a passage between an exhaust manifold of the subset of cylinders and an exhaust passage of the engine, such that control of the valve allows the passage to be selectively fully opened, fully closed, or partially open/closed) and a second valve (disposed in a passage between the exhaust manifold and an intake of the engine, such that control of the valve allows the passage to be selectively fully opened, fully closed, or partially open/closed). The method further comprises receiving information relating to at least one of a pressure or a temperature of the exhaust. For example, the information may be received at a control module from one or more sensors disposed in the exhaust manifold, which are configured to measure temperature or pressure and send information of the pressure or temperature to the control module. The method further comprises generating second control signals for controlling the engine based on the pressure or temperature. For example, fueling of the subset of cylinders may be suspended if the temperature and/or pressure are indicative of the first and second valves being in a control state where both valves are closed concurrently.

As another example, in another embodiment, the second control signals are generated responsive to at least one of the temperature or the pressure being above a designated threshold temperature or a designated threshold pressure, respectively. Alternatively or additionally, the second control signals may be generated responsive to the pressure increasing at a rate that is greater than a designated threshold pressure change rate. The second control signals are configured for changing delivered engine power or changing a fuel supply rate to the subset of cylinders (e.g., the second control signals contain informational content for controlling an engine controller/control unit to change delivered engine power or fuel supply rate responsive to the engine controller/control unit receiving the second control signals).

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   selectively routing exhaust from only a subset of engine cylinders to an exhaust passage via a first valve and to an intake passage via a second valve;
   obtaining one or more of a pressure or a temperature of the exhaust from the subset of engine cylinders; and
   indicating an engine component condition based on the one or more of the pressure or temperature.

2. The method of claim 1, where said one or more of the pressure or the temperature are obtained in an exhaust manifold coupled to the subset.

3. The method of claim 1, further comprising:
   under a first condition where the second valve is closed more than a first threshold amount, routing substantially all of the exhaust from the subset of engine cylinders via the first valve;
   under a second condition where the first valve is closed more than a second threshold amount, routing substantially all of the exhaust from the subset of engine cylinders via the second valve; and
   under a third condition where each of the first and second valves is open greater than respective third and fourth threshold amounts, routing relatively different amounts of the exhaust from the subset of engine cylinders through the first and second valves concurrently.

4. The method of claim 1, wherein the engine component condition indicates degradation responsive to when each of the first and second valves is closed and the obtained temperature or pressure is greater than a corresponding threshold temperature or threshold pressure amount.

5. The method of claim 1, comprising indicating degradation as the engine component condition in response to the exhaust pressure increasing to at least a threshold pressure at a rate that is greater than a threshold pressure change rate.

6. The method of claim 1, comprising indicating degradation as the engine component condition in response to the exhaust temperature increasing to at least a threshold temperature at a rate that is greater than a threshold temperature change rate.

7. The method of claim 1, further comprising responding to the indicated engine component condition by changing a fuel supply rate to the subset of engine cylinders.

8. The method of claim 1, further comprising responding to the indicated engine component condition by changing delivered engine power.

9. The method of claim 1, wherein the engine cylinders of the subset are donor cylinders and the first valve and the second valve are part of an exhaust gas recirculation system.

10. A method, comprising:
    generating first control signals for selectively routing exhaust from only a subset of cylinders of an engine to an exhaust passage of the engine and to an intake passage of the engine;
    receiving information relating to at least one of a pressure or a temperature of the exhaust; and
    generating second control signals for controlling the engine based on the pressure or temperature.

11. The method of claim 10, wherein:
    the information is received from one or more sensors disposed in an exhaust manifold of the subset of cylinders; and
    the second control signals are generated responsive to at least one of the temperature or the pressure being above a designated threshold temperature or a designated threshold pressure, respectively, or the pressure increasing at a rate that is greater than a designated threshold pressure change rate, the second control signals for changing delivered engine power or changing a fuel supply rate to the subset of cylinders.

12. A method, comprising:
    selectively routing exhaust from a subset of engine cylinders to an exhaust passage via a first valve and to an intake passage via a second valve;
    during a first condition, opening the first valve more than the second valve;
    during a second condition, opening the second valve more than the first valve; and
    generating control signals based on one or more of exhaust pressure or exhaust temperature at a location in an exhaust manifold of the subset upstream of the first and second valves, the exhaust manifold of the subset positioned on an opposite bank of an exhaust manifold of remaining engine cylinders.

13. The method of claim 12, wherein during the first condition the second valve is closed and during the second condition the first valve is closed, the method further comprising, during a third condition, opening both the first valve and the second valve.

14. The method of claim 13, wherein the third condition includes operation with a reduced amount of exhaust gas recirculation compared to the second condition.

15. The method of claim 12, wherein the control signals are generated for indicating degradation of an engine component responsive to the first valve and the second valve being concurrently closed greater than a threshold amount.

16. The method of claim 12, wherein the first condition includes operation with a reduced amount of exhaust gas recirculation compared to the second condition or an increase in turbocharger speed.

17. The method of claim 12, wherein the second condition includes operation with an increased amount of exhaust gas recirculation compared to the first condition.

18. The method of claim 12, wherein the control signals are generated for at least one of shutting down the subset of engine cylinders or reducing engine power.

19. The method of claim 12, wherein the control signals are generated for indicating degradation of an engine component when at least one of the temperature or the pressure increases to a threshold temperature or a threshold pressure, respectively, over a duration less than a threshold duration.

20. A system, comprising:
a first valve operable to route exhaust from a subset of cylinders to an exhaust passage of an engine;
a second valve operable to route exhaust from the subset of cylinders to an intake passage of the engine; and
a temperature sensor, a pressure sensor, or both a temperature sensor and a pressure sensor disposable upstream of the first and second valves positioned in a first exhaust manifold of the subset distinct from a second manifold of remaining cylinders, and configured to measure temperature and pressure, respectively.

21. The system of claim 20, further comprising a control system operable to control positions of the first and second valves to selectively route portions of the exhaust to one or more of the intake passage or the exhaust passage, and to identify a component condition based on one or more of the measured temperature or pressure.

22. The system of claim 21, wherein the control system is further operable to change an operating condition of the engine based on the component condition.

23. A system, comprising:
an engine having a subset of donor cylinders coupled to an exhaust gas recirculation system, and further having remaining non-donor cylinders;
a first valve configured to route exhaust from the subset of donor cylinders to an exhaust passage of the engine;
a second valve configured to route exhaust from only the subset of donor cylinders to an intake passage of the engine;
a temperature sensor and a pressure sensor disposed in the exhaust gas recirculation system upstream of the first and second valves and configured to measure temperature and pressure, respectively; and
a control system configured to control positions of the first and second valves to selectively route portions of the exhaust to one or more of the intake passage and the exhaust passage, and to identify degradation of a component of the engine based on one or more of the temperature or pressure.

24. The system of claim 23, wherein degradation of the component is identified responsive to the first valve and the second valve being concurrently closed greater than a threshold amount, and wherein, responsive to the identification of degradation, the control system is further configured to try to open one or more of the first or second valves, and to cut fueling to the subset of cylinders if the temperature or pressure remains above a threshold temperature or threshold pressure, respectively, after a threshold duration.

* * * * *